Sept. 16, 1924.  
K. W. HALLDEN  
CHASSIS CONNECTER FOR AIR SPRINGS  
Filed Dec. 7, 1922  
1,508,787
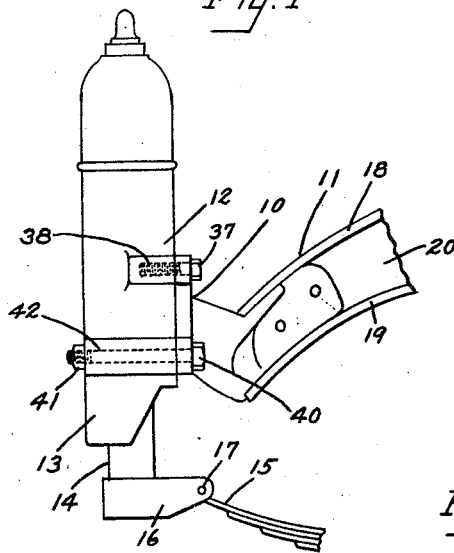
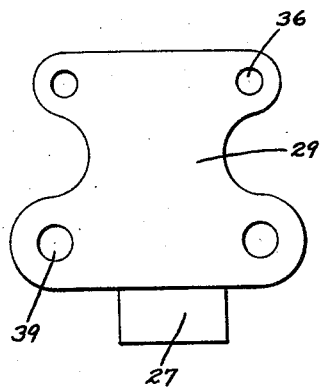
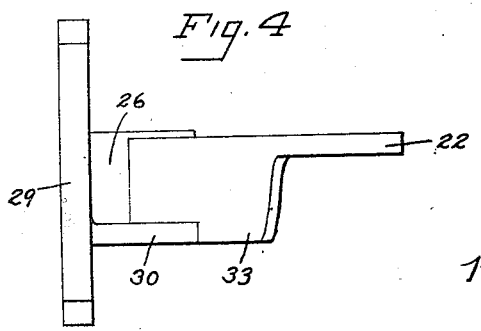
Inventor  
Karl William Hallden,  
By Louis M. Schmidt  
Atty.

Patented Sept. 16, 1924.

1,508,787

UNITED STATES PATENT OFFICE.

KARL WILLIAM HALLDEN, OF WATERBURY, CONNECTICUT.

CHASSIS CONNECTER FOR AIR SPRINGS.

Application filed December 7, 1922. Serial No. 605,350.

*To all whom it may concern:*

Be it known that I, KARL WILLIAM HALLDEN, a citizen of the United States, residing at Waterbury, in the county of New Haven and State of Connecticut, have invented certain new and useful Improvements in Chassis Connecters for Air Springs, of which the following is a specification.

My invention relates to improvements in chassis-connecters for air springs, for use with air springs such as are interposed between the chassis of an automobile and the spring, and particularly of the form that is shown and described in my application filed November 16, 1921, Serial No. 515,728, and having a cylinder that is connected to the chassis and a piston that is connected to the spring, and the object of my improvement is to provide a connecter in the form of a bracket-structure or adapter that is incorporated in the structure of the channel-piece that is provided in the frame of the chassis and that has means for connection with the cylinder of the air spring and which replaces the terminal lug usually provided and has the opening for the shackle-bolt, whereby there is provided a closer association of the connected parts together with a minimum of disturbance of the original relations of the chassis and spring as existed when these parts were connected by the shackle-bolt.

In the accompanying drawing:—

Figure 1 is a side elevation of an air spring connected to a chassis and spring and embodying a connecter in accordance with my invention between the cylinder of the air spring and the chassis, the view being from the inside or middle portion of the car at the front end and towards the right side.

Figure 2 is a side elevation on an enlarged scale of the connecter shown in Fig. 1 and the adjacent end of the frame of the chassis to which it is connected, other adjacent parts being indicated by broken lines.

Figure 3 is a front elevation of the same.

Figure 4 is a plan view of the same.

My improved chassis-connecter 10 comprises a bracket-structure that is interposed between the end portion 11 of the frame of the chassis and the structure of the cylinder 12 of the air spring 13, the latter operating substantially as usual and having the rod or stem 14 of the piston connected to the adjacent end portion 15 of the spring in substantially the usual manner, involving the use of a lug member 16 that is mounted on the rod 14 and a bolt 17. Said bolt 17 corresponds generally to the shackle-bolt that is used when the air spring is not used.

A full set of air springs comprises four individual springs and the connecters to be described are similar, except that there is the distinction between those on the right and on the left to correspond to the difference in detail of the end portion of the chassis frame.

Said end portion 11 is in the form of a channel piece, comprising an inwardly hanging flange 18 at the top edge, a mating flange 19 at the lower edge, and a web 20 interconnecting said flanges.

Said flanges 18 and 19 converge gradually towards the free end and the end portion 11 is shaped, having an appreciably curved form, the entire structure terminating in the form of a plain end face 21. The end portion 11 is directed generally outwardly and downwardly and in the usual structure a lug structure is connected thereto that extends further in the outward and downward direction and that has adjacent the free end an opening for the shackle-bolt. Also, said lug structure has a shouldered portion for abutment against the end face 21 and a supporting plate structure that extends inwardly along the interior of the channel and is held in place by means of rivets that engage with the web portion 20. The connecter 10 has substantially similar means for connection with the chassis, involving the use of the same holes for rivets or bolts in the end portion 11, but differs from the lug structure mentioned in the detail of the connection with the cylinder 12. The opening for the shackle-bolt is omitted and a structure is provided that is relatively more compact and permits of a better positioning of the cylinder in its relation to the adjacent and cooperating parts.

Thus as the connecting means there are provided a plate-like stem 22 that fits between the flanges 18 and 19 and lays against the web 20 and has openings 23 for the rivets 24. Also there is the shoulder structure 25 for abutting against the end face 21 of the chassis frame structure.

The shoulder structure 25 constitutes the upper face of a base or junction portion 26 that has a rounded bottom face 27 and that extends across the lower and outer end of the stem 22. The general direction of the base 26 is at an appreciable inclination upwardly and outwardly and the outer end 27 thereof merges with the lower end portion 28 of a plate structure 29 that is directed vertically and is of appreciable area and thickness.

Said plate structure 29 serves as the means for connection with the cylinder 12, having a set of holes for the connecting screws and bolts.

A reinforcing web 30 is provided along one side of the base 26, extending rearwardly from the rear face 31 of the plate 29 in a vertical plane and connecting at the rear end with the stem 22 by means of suitable extensions thereof. Thus there is provided an enlargement 32 in the form of a filling at the junction of the web 30 with the base 26 and the stem 22. Above the enlargement 32 is a flange 33 that lays under the flange 18 and merges with the rear edge portion of the web 30. As described, the reinforcing web 30 is offset to one side so as to avoid the flange 18 of the chassis frame.

The outer face 34 of the plate 29 is plain and fits against a corresponding surface on the opposed portion 35 of the cylinder 12, and these parts are held together by means of the screws and bolts mentioned. At the upper portion of the plate 29 is a pair of holes 36 for screws 37 that engage with threaded openings 38 in the structure of the cylinder 12. At the lower portion of said plate 29 is a pair of holes 39 for bolts 40 that are provided with nuts 41, said bolts 40 being projected through holes 42 in the structure of the cylinder 12.

In the structure described there is no opening in the chassis frame that is adapted to receive the shackle-bolt 17 and the connecting means for the cylinder are constructed and arranged to provide for the most advantageous positioning of the cylinder relatively to the cooperating parts. Such positioning is effected virtually by means of the base 26, which is extended from the stem 22 and directed relatively thereto so as to effect the desired result. The web 30 operates virtually as a tie for reinforcing the structure.

The omission of the opening in the chassis frame for the shackle bolt referred to above involves a corresponding omission of the material, in the form of a lug, that is usually provided for said opening.

Such a lug would operate as an obstruction to the free upward and downward movement of the chassis under conditions of use, particularly by limiting the downward movement by contacting with the opposed adjacent portion of the spring.

The construction shown and described provides extra clearance between the parts so that in the lower limit in the position of the chassis the latter is actually located appreciably lower than is possible with the air spring omitted and the chassis and spring connected in the usual manner by the shackle bolt.

Also, said construction attains the results mentioned without any changes whatsoever in the details of the spring. The structure may be briefly described as being generally of V-shape, the plate-like stem 22 constituting one side and the plate structure or connecting plate 29 constituting the other side, the sides meeting at an acute angle, and the base or junction portion 26 being at the apex. The stem 22 lays against the web of the channeled end of the frame and fits between the flanges. The transversely directed flange 33 at the upper edge portion of the stem 22 underlays the flange 18 of the chassis frame and thus serves as means for avoiding said flange 18 for effecting a reinforcement of the connecter structure by means of the connecter web 30.

I claim as my invention:—

1. In an automobile-air spring combination, an adapter in the form of a bracket-like structure having on one side a supporting plate for connecting with the air spring and on the other side a stem for connecting with the chassis-frame end, said plate and stem cooperating to form a substantially V-shaped structure with ends that are adjacent and merging one with the other, and a web-like connecter plate filling part of the gap between said plate and stem, being connected on one side to said plate and on the other side to said stem, and said stem being adapted to lie and fasten within the channeled horn at said chassis-frame end.

2. A bracket structure for connecting an air spring with a chassis of an automobile comprising a stem for connecting with the automobile structure, a plate-like structure for connecting with the air spring, a base uniting one end of said stem with one end of said plate-like structure, and a reinforcing web connecting the body portions of said stem and plate-like structure, said stem being directed generally upwardly and outwardly from said base on one side thereof, and said plate-like structure being positioned upwardly and outwardly in off-set relation on the other side, and said web being off-set laterally relatively to said stem, whereby the stem can be entered into the space between the flanges of a channel formation of the cooperating portion of the automobile structure.

3. In an automobile-air spring combination, a chassis frame end portion of channel form, an air spring having a vertically directed cylinder body, and an adapter serving as the means for connecting said end portion and body, said frame end portion being directed generally upwardly and towards one side of its end face, said adapter comprising a base for being seated against said end face and a stem that is directed upwardly and towards one side and is entered into the adjacent channel, and said adapter having connecting means for the air spring body that are positioned on the other side of said end face.

KARL WILLIAM HALLDEN